United States Patent
Maheshwari

(10) Patent No.: US 7,436,688 B1
(45) Date of Patent: Oct. 14, 2008

(54) PRIORITY ENCODER CIRCUIT AND METHOD

(75) Inventor: Dinesh Maheshwari, Fremont, CA (US)

(73) Assignee: Netlogic Microsystems, Inc., Mountain View, CA (US)

( * ) Notice: Subject to any disclaimer, the term of this patent is extended or adjusted under 35 U.S.C. 154(b) by 130 days.

(21) Appl. No.: 11/429,705

(22) Filed: May 8, 2006

Related U.S. Application Data

(60) Provisional application No. 60/678,468, filed on May 6, 2005.

(51) Int. Cl.
*G11C 15/00* (2006.01)

(52) U.S. Cl. .............. 365/49; 365/230.02; 365/230.06; 711/108

(58) Field of Classification Search ........... 365/49 O, 365/230.02 X, 230.06 X, 49, 230.02, 230.06; 711/108 X, 108
See application file for complete search history.

(56) References Cited

U.S. PATENT DOCUMENTS

| | | | |
|---|---|---|---|
| 4,670,858 A | 6/1987 | Almy | |
| 4,928,260 A | 5/1990 | Chuang et al. | |
| 6,195,277 B1 | 2/2001 | Sywyk et al. | |
| 6,268,807 B1 | 7/2001 | Miller et al. | |
| 6,392,910 B1 * | 5/2002 | Podaima et al. | ............... 365/49 |
| 6,420,990 B1 | 7/2002 | Voelkel | |
| 6,542,391 B2 | 4/2003 | Pereira et al. | |
| 6,718,433 B1 | 4/2004 | Pereira | |
| 6,757,779 B1 | 6/2004 | Nataraj et al. | |
| 6,903,951 B1 | 6/2005 | James et al. | |
| 6,910,097 B1 | 6/2005 | Srinivasan et al. | |
| 6,934,795 B2 | 8/2005 | Nataraj et al. | |
| 7,000,066 B1 | 2/2006 | Wanzakhade et al. | |
| 7,043,601 B2 * | 5/2006 | McKenzie et al. | .......... 711/108 |
| 7,110,407 B1 | 9/2006 | Khanna | |
| 7,111,123 B1 | 9/2006 | Zou | |
| 7,219,188 B1 | 5/2007 | Pereira | |
| 2005/0027931 A1 | 2/2005 | Joshi | |

* cited by examiner

*Primary Examiner*—VanThu Nguyen
(74) *Attorney, Agent, or Firm*—Haverstock & Owens, LLP

(57) ABSTRACT

A priority encoder circuit can include a number of sectional encoder circuits that each encode "m" inputs signals into sets of "P" encoder outputs, where m>p. Each sectional encoder circuit can also output a group indication signal representing the activation of any of the received m encoding input signals. Priority encoder logic can prioritized the group indication signals. A memory can include a different storage location accessed by each prioritized group indication signal.

20 Claims, 5 Drawing Sheets

US 7,436,688 B1

PRIORITY ENCODER CIRCUIT AND METHOD

PRIORITY ENCODER CIRCUIT AND METHOD

This application claims the benefit of U.S. Provisional Patent Application Ser. No. 60/678,468, filed May 6, 2006, the contents of which are incorporated by reference herein.

TECHNICAL FIELD

The present invention relates generally to encoding circuits, and more particularly to priority encoder circuits that prioritize multiple input signals and generate a multi-bit value corresponding to a highest priority input signal.

BACKGROUND OF THE INVENTION

Priority encoder circuits can receive multiple signals, and prioritize such signals according to a predetermined order. In addition, a highest priority signal can be represented by a digital value, typically corresponding to a physical location generating the highest priority signal. Priority encoder circuits are often used in content addressable memory (CAM) devices to prioritize match indications, and thereby identify a highest priority match result.

A conventional priority encoder circuit is shown in FIG. 9 and designated by the general reference character 900. Priority encoder circuit 900 can be one of many such circuits, each of which prioritizes its own local set of match indications. As such, priority encoder circuit 900 can be considered a "local" priority encoder (LPE) circuit. Conventional LPE circuit 900 can receive "n" encoder input signals 902, arbitrarily shown in groups of four in FIG. 9. An "n×n" priority encoder logic circuit 904 can prioritize active input signals to generate n corresponding prioritized output signals 906. Only one highest priority signal will be activated in response to one or more active input signals. In the conventional LPE circuit 900 n prioritized output signals 906 can be fed into a read only memory (ROM) 908. A ROM 908 can include n locations each accessible by a corresponding prioritized output signal. Locations of ROM 908 can encode each n prioritized output signal into a unique $\log_2(n)$ digital value.

In order to prioritize from among the "n" encoder input signals 902, priority encoder logic 904 must "suppress" any active input signals of lower priority. As a result, in a prioritizing operation, the status of a highest priority encoder input signals 902 must "percolate" down through "n" lower priority inputs. This can contribute to delay between the time one or more active input signals is received and the generation of a ROM output value.

DETAILED DESCRIPTION

Various embodiments of the present invention will now be described in detail with reference to a number of drawings. The embodiments show priority decoder circuits that generate an encoded result corresponding to a highest priority signal from among n encoder input signals. Such a result can be achieved without requiring a highest priority result to sequentially enable or disable all lower priority results.

Figure 1:
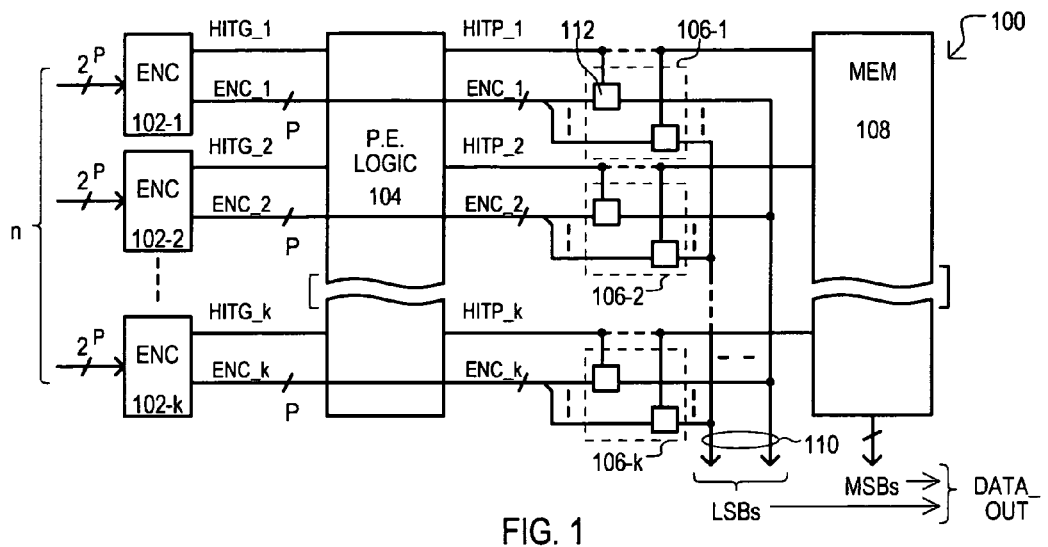
FIG. 1 is a block schematic diagram of a first embodiment of the present invention.

A priority encoder circuit according to a first embodiment is shown in a block schematic diagram in FIG. 1, and designated by the general reference character 100. A priority encoder circuit 100 can include a number of section encoders 102-1 to 102-k, priority encoder logic 104, a number of pass circuits 106-1 to 106-k, and a memory circuit 108. Priority encoder circuit 100 can receive "n" encoder input signals, prioritize such signals, and output a digital value DATA_OUT identifying a highest priority active encoder input signal.

Each section encoder (102-1 to 102-k) can encode the status of a group of $2^P$ encoder input signals into an encoded output value (ENC_1 to ENC_k) that includes a set of P signals. In addition, each section encoder (102-1 to 102-k) can generate a group indication signal (HITG_1 to HITG_k). A group indication signal (HITG_1 to HITG_k) can be active in the event any of the $2^P$ encoder input signals received by the section encoder is active.

Priority encoder logic 104 can prioritize group indication signals (HITG_1 to HITG_k) to output corresponding prioritized group indication signals (HITP_1 to HITP_k). Priority encoder logic 104 can be conventional in design, prioritizing from among active group indication signals (HITG_1 to HITG_k) to activate the one prioritized group indication signal corresponding to a highest priority active group indication signal. However, it is noted that such a prioritization step can involve the percolation (i.e., sequential possible suppression) through "k-1" signals, rather than "n-1" signals, as would be the case in a conventional approach (i.e., $n=k*2^P$).

Each pass circuit (106-1 to 106-k) can be connected between a corresponding encoded set of P values and P output lines 110. In the arrangement of FIG. 1, each pass circuit (106-1 to 106-k) can include P gating devices, one of which is shown as 112. Each gating device connects one of the P values to a corresponding one of the output lines 110. Accordingly, in the event priority encoder logic 104 activates one of the prioritized group indication signals (HITP_1 to HITP_k), the corresponding encoded output value (ENC_1 to ENC_k) can be output on output lines 110. Such an encoded output value can form the least significant bits (LSBs) of an output data value DATA_OUT.

In this way, portions of the n encoder inputs can be encoded essentially "directly", as one value does not sequentially suppress any other value.

A memory circuit 108 can include a storage location corresponding to each prioritized group indication signal. In response to an active group indication signal, memory circuit 108 can output a value at the corresponding storage location. Such a value can form the most significant bits (MSBs) of an output data value DATA_OUT. A memory circuit 108 can include a random access memory (RAM) or read only memory (ROM), as but two examples. Thus, stored data values may be read only, or may be writable or programmable.

Figure 9:
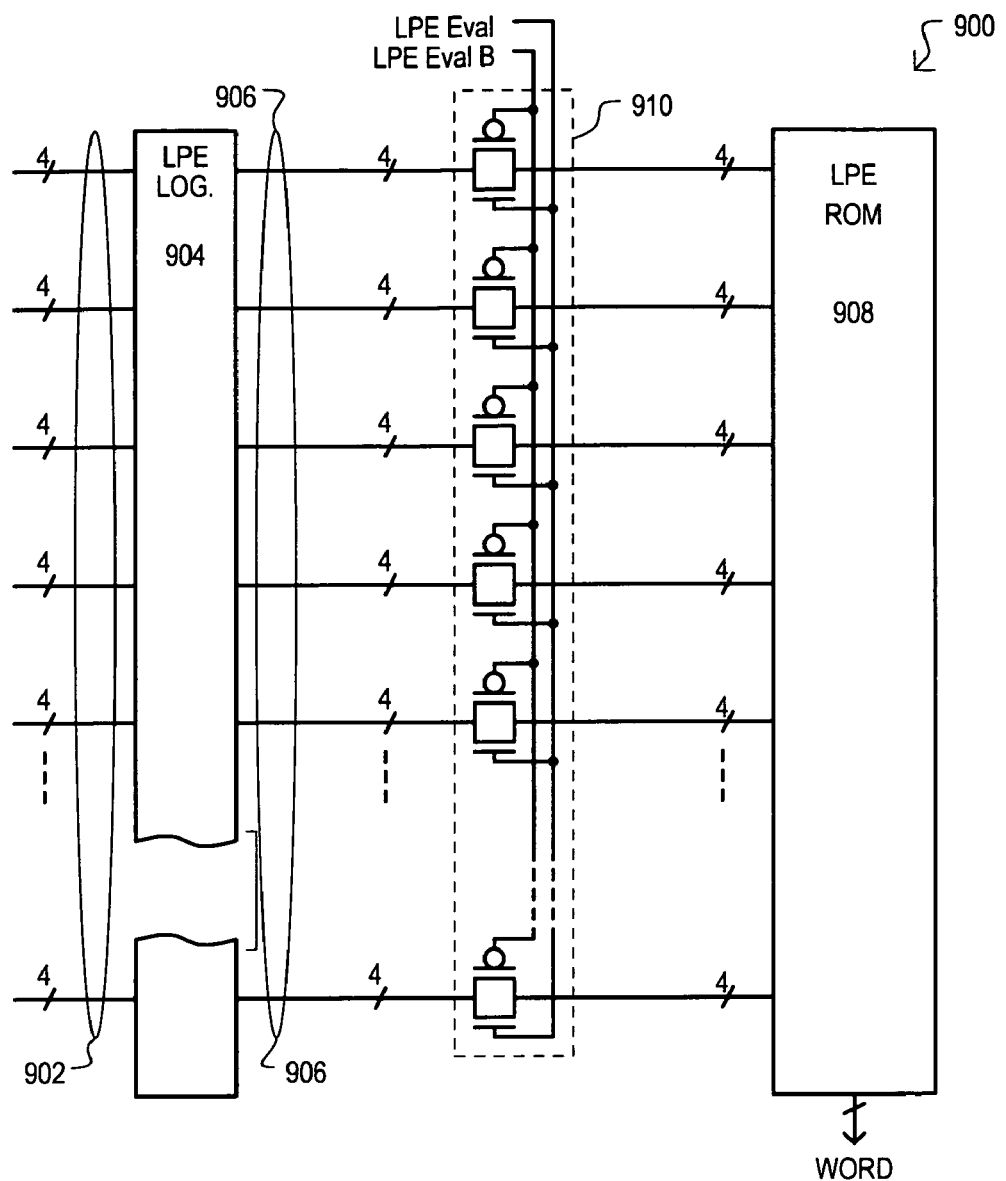
FIG. 9 is a block schematic diagram of a conventional priority encoder circuit.

In this way, a priority encoder circuit can priority encode signals representing groups of encoder input signals, rather than all encoder input signals in a single sequential suppression operation. For example, rather than priority encode n encoder input signals, n/m encoder signals can be priority encoded, with groups of m encoder input signals being "directly" encoded, as described above. Such an arrangement can reduce overall priority resolution time as compared to conventional approaches like that of FIG. 9. In addition, priority encoder logic can be a smaller circuit, as it processes only a fraction of the number of signals as a conventional approach (i.e., n in a conventional approach, $n/2^P$ in the above embodiment).

Figure 2:
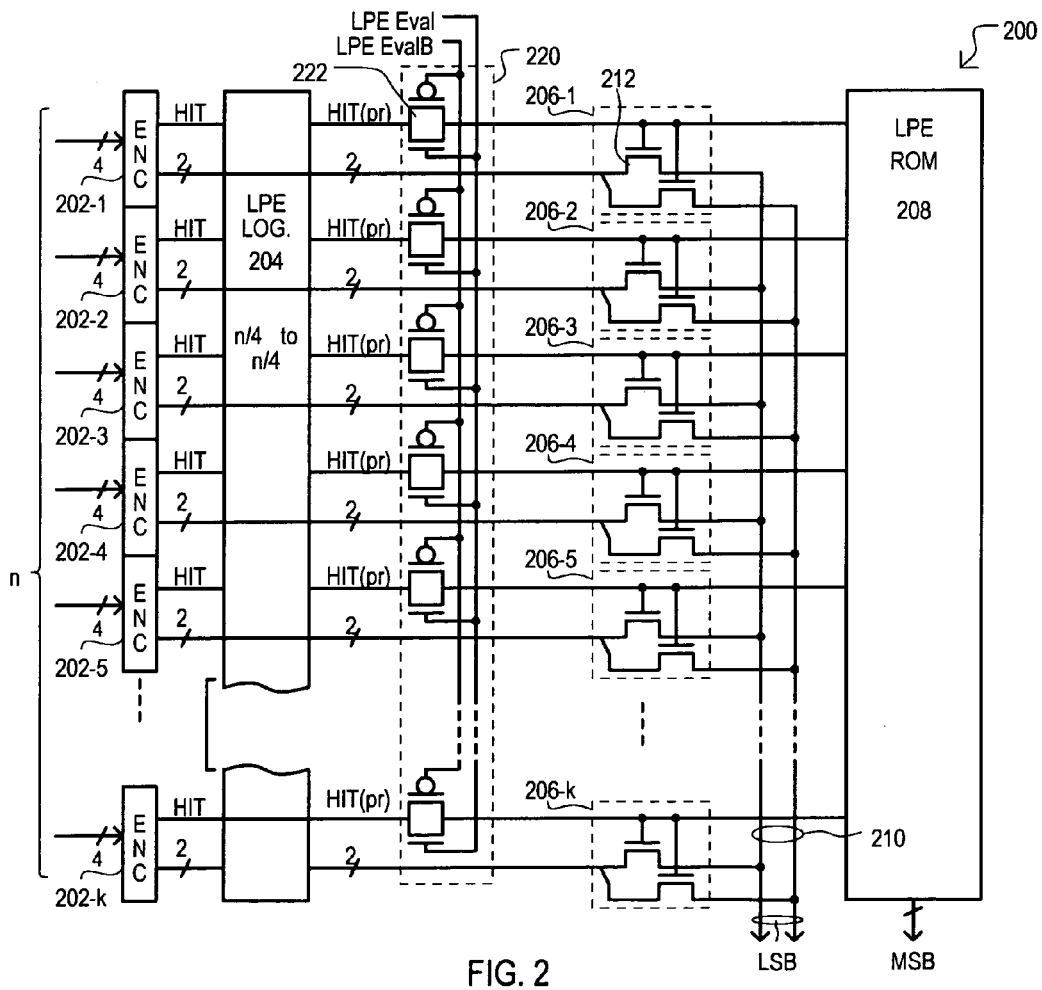
FIG. 2 is a block schematic diagram of a second embodiment of the present invention.

Referring now to FIG. 2, a priority encoder circuit according to a second embodiment is shown in a block schematic diagram, and designated by the general reference character 200. The example of FIG. 2 can be a "local" priority encoder (LPE) circuit that encodes one portion of a large number of encoder inputs values. Such a circuit can be selectively disabled, and thus excluded from a larger prioritization operation.

The embodiment of FIG. 2 can include some of the same general sections as FIG. 1. Like sections are referred to by the same reference character but with the first digit being a "2" instead of a "1".

In the example of FIG. 2, each section encoder (202-1 to 202-k) can encode the state of four encoder input signals into a two-bit value. As a result, priority encoder logic 204 can provide n/4 to n/4 priority encoding.

Within each pass circuit 206-1 to 206-k, a gating device (e.g., 212) can be an n-channel insulated gate field effect transistor (IGFET) having a source-drain path connected between one of the P encoded bits values, and a corresponding output line 210. The gates of such IGFETs can be connected to a corresponding prioritized group indication signal HIT(pr).

The particular memory circuit 208 of FIG. 2 can be a ROM providing output values from 0 to (k-1).

Unlike the arrangement of FIG. 1, the example of FIG. 2 also includes a disable section 220. A disable section 220 can prevent prioritized group indication signals HIT(pr) from being applied to corresponding pass circuits (206-1 to 206-k) or to memory circuit 208. This can prevent any encoding results from being generated. A disable section 220 can include a passgate (one of which is shown as 222) situated between each prioritized group indication signal HIT(pr) and the memory circuit 208 and corresponding pass circuit (206-1 to 206-k). In the very particular example of FIG. 2, a passgate (e.g., 222) can be complementary metal-oxide-semiconductor (CMOS) type passgate that is enabled in response to complementary signals LPE Eval and LPE EvalB.

In this way, a local priority encoder circuit, having a relatively fast priority resolution time, can be selectively disabled.

Figure 3:
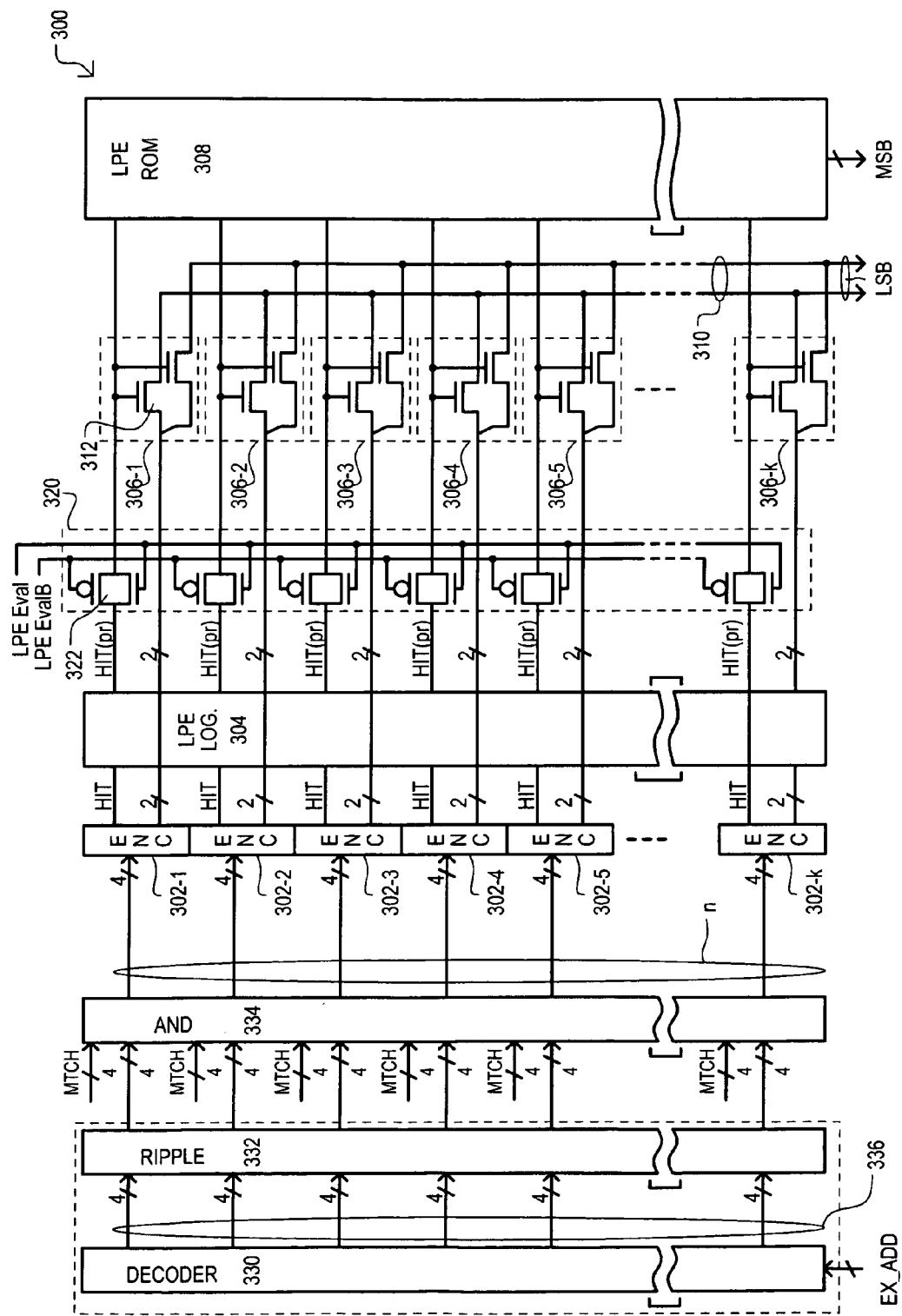
FIG. 3 is a block schematic diagram of a third embodiment of the present invention.

Referring now to FIG. 3, a local priority encoder circuit according to a third embodiment is shown in a block schematic diagram, and designated by the general reference character 300. The embodiment of FIG. 3 can include some of the same general sections as FIG. 2. Like sections are referred to by the same reference character but with the first digit being a "3" instead of a "2".

The embodiment of FIG. 3 can support an "Explore" function in a priority encoder. Such a function can be utilized in a content addressable memory (CAM) device to search beyond a first matching entry to a next, lower priority matching entry.

Unlike the arrangement of FIG. 2, LPE 300 of FIG. 3 can further include a decoder 330, a "ripple" circuit 332, and match combining logic 334. A decoder 330 can receive an explore address value EX_ADD. Such a value can correspond to a previously determined match result (or such a value incremented by one). A value EX_ADD can be decoded to activate one of n decoder outputs 336.

A ripple circuit 332 can receive n decoder outputs and provide n corresponding "string" outputs. A ripple circuit 332 can activate those string outputs corresponding to addresses greater than (or greater than or equal to) the value EX_ADD, and deactivate those string outputs less than or equal to (or less than) the value EX_ADD.

Decoder 330 and ripple circuit 332 can operate together to form a "string" decoder 333. A string decoder 333 can divide consecutive groups of output signals into activated signals and deactivated signals in response to an address value.

Match combining logic 334 can combine each string output with a corresponding match indication MTCH (arbitrarily shown in groups of four) to generate encoder inputs.

In this way, an address can be used to exclude certain match indications from being applied as encoder inputs to a priority encoder circuit.

Figure 4:
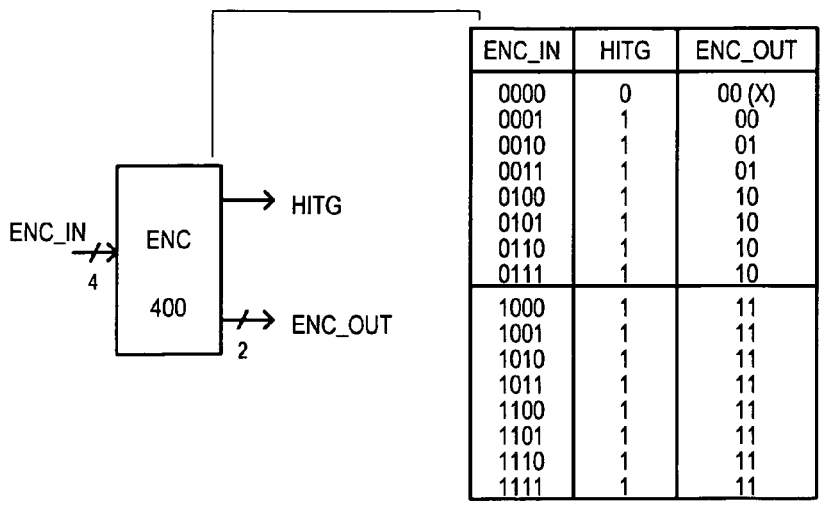
FIG. 4 shows the operation of a section encoder according to an embodiment.

Referring now to FIG. 4, one example of section encoding arrangement is shown in FIG. 4. FIG. 4 shows an encoder circuit, which can correspond to section encoders shown as 102-1 to 102-k, 202-1 to 202-k, or 302-1 to 302-k in FIGS. 1-3. FIG. 4 includes a table showing various possible four signal encoder input values ENC_IN and resulting group indication values HITG and encoder output value ENC_OUT. A value (X) for ENC_OUT value shows that for an input value of "0000" a resulting output value can be a "don't care" value. Of course, FIG. 4 shows but one possible encoding arrangement.

Figures 5A, 5B, 5C:
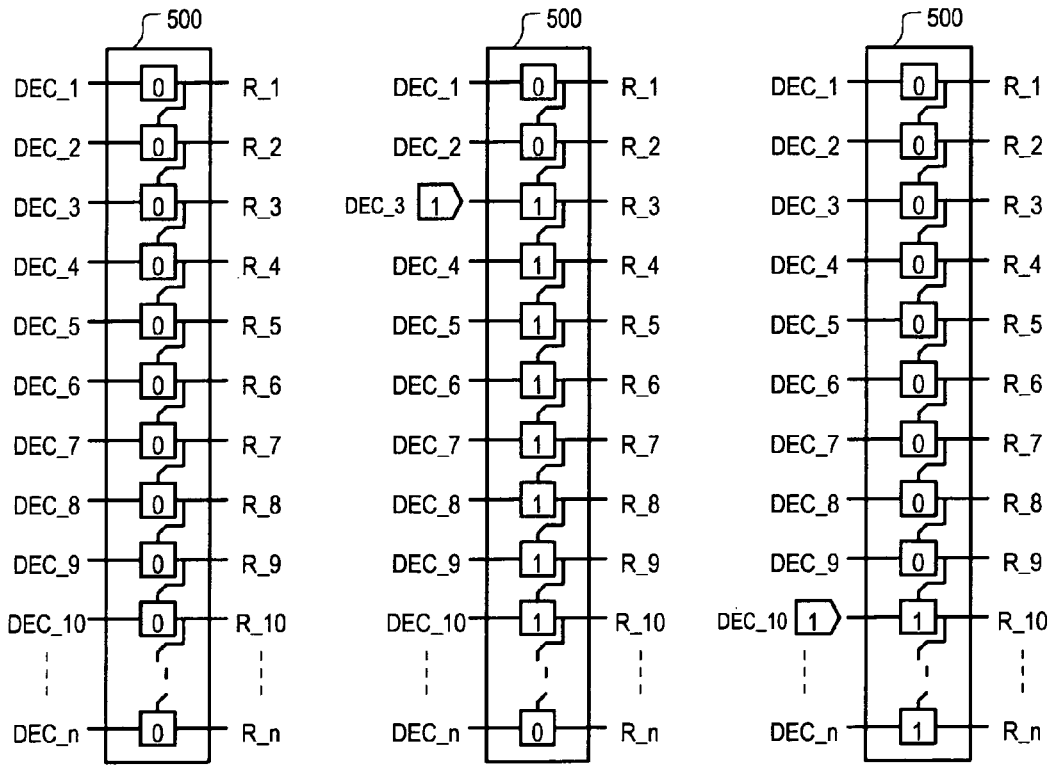
FIGS. 5A to 5C are block diagrams showing the operation of a ripple circuit according to an embodiment.

Referring now to FIGS. 5A to 5C, the operation of a ripple circuit, like that shown as 332, is shown in a series of block schematic diagrams. Each of FIGS. 5A to 5C shows a ripple circuit 500 that receives decoder signals DEC_1 to DEC_n and outputs ripple signals R_1 to R_n. Ripple circuit 500 can include a number of ripple sections, one of which is shown as 502, each corresponding to a decoder signal and ripple signal. FIG. 5A shows a ripple circuit 500 prior to a decoding operation. All sections (e.g., 502) can be set to an inactive level, in this case a logic "0". Such a state can exist after a precharge or other operation preceding a prioritization operation.

FIG. 5B shows ripple circuit 500 following a first example decoding operation that results in the activation of decoder signal DEC_3. In response to the activation of this signal, all ripple signals corresponding to lower address values, in this case R_1 to R_2, remain inactive. However, ripple signals corresponding to higher address values, in this case R_4 to R_n, can be activated. FIG. 5B shows an arrangement in which signals greater than or equal to a received address are activated, thus signal R_3 is also activated.

FIG. 5C shows ripple circuit 500 following a second example decoding operation that results in the activation of decoder signal DEC_10.

Figure 6:
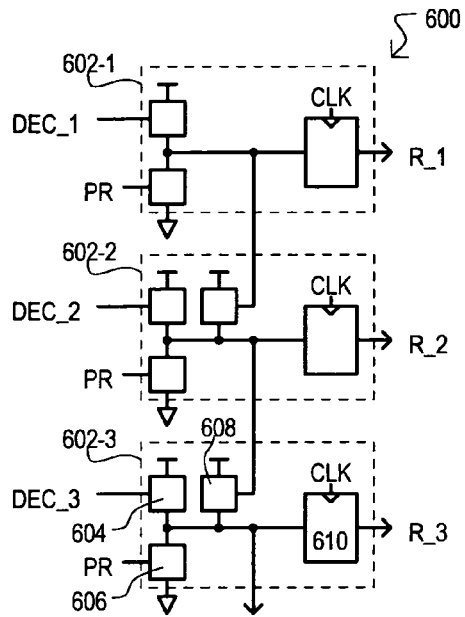
FIG. 6 is a schematic diagram showing a ripple circuit according to an embodiment.

Referring now to FIG. 6, one very particular example of a ripple circuit is shown in a more detailed block schematic diagram and designated by the general reference character 600. FIG. 6 shows three ripple sections 602-1 to 602-3. Because each ripple section can include similar structures, only ripple section 602-3 will be described in detail. A ripple section 602-3 can include a pull-up device 604, a pull-down device 606 and register 610. All but a first ripple section 602-1 can also include a ripple pull-up device 608. A signal pull-down device 606 can drive an input of a corresponding register 610 high in response to a corresponding decoder signal (e.g., DEC_3). Pull-down device 606 can drive an input of register 610 low in response to a precharge signal PR. Ripple pull-up device 608 can drive the input to a corresponding register high in response to the input of the next higher priority register. Of course, FIG. 6 shows but one of the many possible examples of a ripple circuit.

Figure 7:
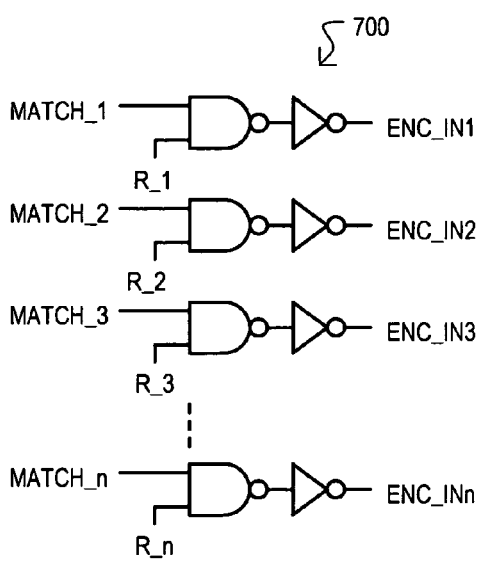
FIG. 7 is a schematic diagram of a logic combination section according to an embodiment.

Referring now to FIG. 7, one very particular example of match combining logic, like that shown as 334 in FIG. 3, is shown a schematic diagram and designated by the general reference character 700. As shown, combining logic 700 can logically AND match signals MATCH_1 to MATCH_n with corresponding ripple outputs R_1 to R_n, respectively, to generate encoder input signals (ENCIN_1 to ENCIN_n). FIG. 7 shows one particular logic arrangement. Embodiments can include other logic arrangements according to signaling convention and/or type of encoder input disabling desired.

Figure 8:
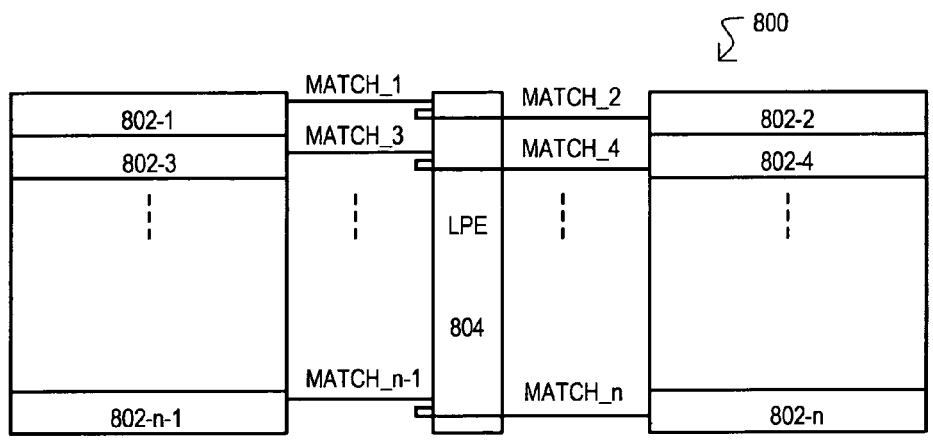
FIG. 8 is a block schematic diagram of a fourth embodiment of the present invention.

Referring now to FIG. 8, a content addressable memory (CAM) device according to a fourth embodiment is shown in block schematic diagram and designated by the general reference character 800. A CAM device 800 can include a first CAM array 802-0 and a second CAM array 802-1 and a priority encoder circuit 804. Each CAM array (802-0 and 802-1) can include a number of CAM cell groups 806-1 to 806-n distributed between both CAM arrays (802-0 and 802-1). Each CAM cell group (806-1 to 806-n) can generate a match indication MATCH_1 to MATCH_n which can be received by priority encoder circuit 804. Priority encoder circuit 804 can include any of the priority encoder circuits described above.

In this way, CAM match indications can be priority encoded according to the methods described above.

While the above embodiments have shown particular encoding arrangements that can encode $\log_2 P$ values into P-bit encoded values, such an arrangement should not necessarily be construed as limiting to the invention.

It is also understood that the embodiments of the invention may be practiced in the absence of an element and or step not specifically disclosed. That is, an inventive feature of the invention can be elimination of an element.

Embodiments of the present invention are well suited to performing various other steps or variations of the steps recited herein, and in a sequence other than that depicted and/or described herein. In one embodiment, such a process is carried out by processors and other electrical and electronic components, e.g., executing computer readable and computer executable instructions comprising code contained in a computer usable medium.

For purposes of clarity, many of the details of the improved circuit and the methods of designing and manufacturing the same that are widely known and are not relevant to the present invention have been omitted from the following description.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Accordingly, while the various aspects of the particular embodiments set forth herein have been described in detail, the present invention could be subject to various changes, substitutions, and alterations without departing from the spirit and scope of the invention.

What is claimed is:

1. A priority encoder circuit, comprising:
 a plurality of sectional encoder circuits, each sectional encoder circuit receiving a different group of m encoding inputs signals and outputting a group indication signal representing the activation of any of the m encoding input signals and also outputting a set of p encoder outputs representing the status of the group of m encoding inputs, where m and p are integers, and m>p;
 a priority encoder logic circuit that receives the group indication signals, and outputs a corresponding set of prioritized group indication signals, only a highest priority prioritized group indication signal being activated in response to one or more active group indication signals; and
 a memory that includes a different storage location accessed by each prioritized group indication signal, each storage location storing a multi-bit output data value.

2. The priority encoder circuit of 1, wherein:
 the number of encoding input signals is n, and the value $m=2^P$.

3. The priority encoder circuit of claim 2, wherein:
 the value p=2 and each output value includes $\log_2(n/4)$ bits.

4. The priority encoder circuit of claim 1, further including:
 a pass circuit corresponding to each set of p encoder outputs, each pass circuit selectively coupling the corresponding set of p encoder outputs to p output lines in response to the corresponding prioritized group indication signal.

5. The priority encoder circuit of claim 4, wherein:
 the p output lines provide least significant bits of an address corresponding to a highest priority active encoder input signal; and
 the multi-bit output data value provided by the memory provides more significant bits of the address corresponding to the highest priority active encoder input signal.

6. The priority encoder circuit of claim 4, wherein:
 each pass circuit includes a controllable impedance path coupled between each p encoder output and a corresponding one of the p output lines, each controllable impedance path being controlled by the corresponding prioritized group indication signal.

7. The priority encoder circuit of claim 4, further including:
 an enable section that includes a different enable gate coupled between each prioritized group indication signal and the memory, the enable gates commonly providing low impedance paths in response to at least one enable signal.

8. The priority encoder circuit of claim 7, wherein:

each enable gate is further coupled between each prioritized group indication signal and the pass circuit corresponding to the prioritized group indication signal.

9. The priority encoder circuit of claim 1, further including:

a string decoder that receives an address value and outputs a plurality of decoder output values, the string decoder driving decoder output values corresponding to address values higher than a received address value to one logic value and decoder output values corresponding to address values lower than the received address value to another logic value.

10. The priority encoder circuit of claim 9, further including:

a logic circuit that logically combines each different decoder output value with a corresponding match indication signal to generate the encoder input signals.

11. The priority encoder circuit of claim 10, further including:

a plurality of content addressable memory (CAM) cell groups, each CAM cell group activating a corresponding match line based on a comparison between an applied compare data value and a data value stored by the CAM cell group.

12. A method of prioritizing and encoding a plurality of signals, comprising the steps of:

for each of a plurality of groups of encoder inputs, encoding the state of the encoder inputs into corresponding digital value sets having fewer bits than the number of encoder inputs of the group;

for each group of encoder inputs, activating a corresponding group indication signal when any of the encoder inputs of the group is active;

prioritizing any active group indication signals according to a predetermined priority to activate only one prioritized group indication signal in response to the activation of any group indication signal, each prioritized group indication signal corresponding to each digital value set; and selectively outputting the corresponding digital value set in response to the corresponding prioritized group indication signal being activated.

13. The method of claim 12, wherein:

each group of encoder inputs includes groups of $2^P$ encoder inputs, and each group of encoder inputs is encoded into a P digital value set, where P is an integer greater than 0.

14. The method of claim 12, further including:

outputting a multi-bit digital value in response to each active prioritized group indication signal.

15. The method of claim 12, further including:

in response to a received address, driving decoder output signals corresponding to addresses higher than the received address to one logic value and decoder output signals corresponding to addresses lower than the received address to another logic value; and logically combining each decoder output signal with a corresponding match value to generate an encoder input.

16. A priority encoder circuit, comprising:

a priority encoder logic circuit having k inputs that prioritize active group encoder input signals according to a predetermined order to activate one of k prioritized group indication signals, where k is an integer greater than one;

k encoder circuits that each encode a different set of m encoder input signals into an encoded value of log2(m) bits, and logically combine each different set of m encoder input signals to generate a group encoder input signal; and k pass circuits that selectively output the encoded value of a corresponding encoder circuit according a corresponding group indication signal.

17. The priority encoder circuit of claim 16, further including:

a memory having a storage entry corresponding to each prioritized group indication signal.

18. The priority encoder circuit of claim 17, wherein:

each storage entry of the memory stores a $log_2(k)$ bit memory value.

19. The priority encoder circuit of claim 16, further including:

at least one content addressable memory (CAM) array comprising a plurality of CAM cells arranged in logical groups, each logical group outputting a match indication, each encoder input signal being generated in response to a match indication.

20. The priority encoder circuit of claim 19, further including:

a string decoder that receives an address value and outputs a plurality of decode outputs, the string decoder driving decode outputs corresponding to address values higher than a received address value to one logic value and address values lower than the received address value to another logic value; and a logic circuit that logically combines each decode output with a corresponding match indication to generate an encoder input.

* * * * *